United States Patent [19]

Leiber

[11] Patent Number: 4,463,561
[45] Date of Patent: Aug. 7, 1984

[54] BRAKING-FORCE BOOSTER

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 415,942

[22] Filed: Sep. 8, 1982

[30] Foreign Application Priority Data

Apr. 28, 1982 [DE] Fed. Rep. of Germany ....... 3215737

[51] Int. Cl.³ .............................................. B60T 13/12
[52] U.S. Cl. .................................... 60/547.1; 60/548; 60/552; 60/582; 91/376 R; 91/434
[58] Field of Search ...................... 60/547.1, 548, 552, 60/582; 91/376 R, 434, 370, 371, 372, 373

[56] References Cited

U.S. PATENT DOCUMENTS 3,815,364 6/1974 Belart et al. ........................... 60/552
4,126,996 11/1978 Leiber ................................. 60/547.1

FOREIGN PATENT DOCUMENTS 2070167 9/1981 United Kingdom ............... 60/547.1

Primary Examiner—Robert E. Garrett
Assistant Examiner—Scott L. Moritz
Attorney, Agent, or Firm—Edwin E. Greigg

[57] ABSTRACT

A braking-force booster which contains a pressure source, a pedal operated control valve and at least one main brake cylinder; a piston which creates the brake pressure, is exposed to the pressure created in the main brake cylinder by means of the control valve, wherein the control valve, dependent on the pedal displacement, interrupts a connecting channel between the main brake cylinder and a pressureless connection and temporarily creates a second connecting channel between the pressure source and the main brake cylinder. The pedal operated control valve contains a plunger movable by the pedal which extend into the main brake cylinder, and the first connecting channel is integrated into the main brake cylinder piston. The first plunger has a valve closing member for shutting off this connecting channel during the corresponding approach. Finally, a seat valve is integrated into the first plunger 11 to close the second connecting channel 12, and a second plunger 19, supported on the main brake cylinder piston 3, opens the seat valve 13 at the corresponding approach of the first plunger 11 towards the main brake cylinder piston 3.

1 Claim, 1 Drawing Figure

U.S. Patent      Aug. 7, 1984      4,463,561
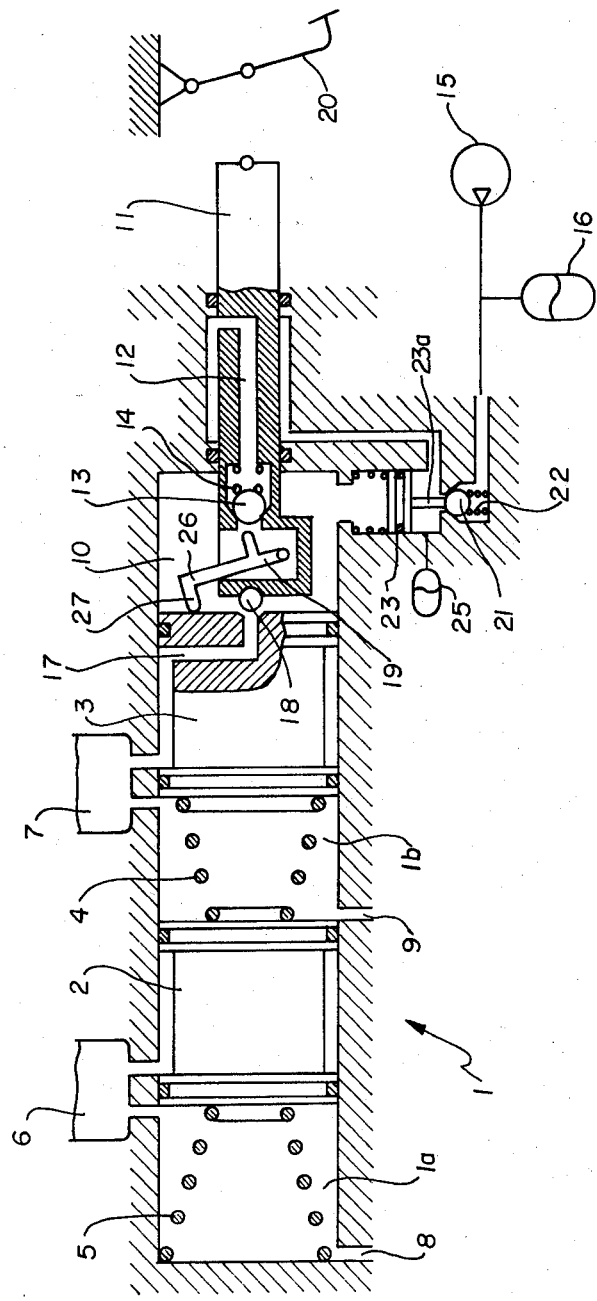

BRAKING-FORCE BOOSTER

BACKGROUND OF THE INVENTION

The present invention relates to a braking-force booster containing a pressure source, a pedal-operated control valve and at least one main brake cylinder, the braking-force generating piston is subjected to the pressure generated in the main brake cylinder by means of the control valve, wherein the control valve in accordance with the pedal deflection closes a first connecting passage between the main brake cylinder and a pressureless connection and temporarily creates a second connecting passage between the pressure source and the main brake cylinder.

A braking-force booster with the above characteristics is known, for instance, from German Offenlegungsschrift No. 2 344 969, wherein a tandem main brake cylinder for dual brake circuits is provided. In this known apparatus the brake valve and the tandem main brake cylinder are shown as separate components. It is known to house the two components of essentially equal functional construction in one unit.

OBJECT AND SUMMARY OF THE INVENTION

The present invention has the purpose of providing a braking-force booster in which the two components are also combined and which has the advantage of a short over-all length.

The short over-all length is achieved in the present invention by having the pressure medium supply take place by means of the pedal plunger and the pressure medium discharge by means of the main brake cylinder(s). This solution has the additional advantage that relatively few seals are needed, so that losses through friction are small.

The invention will be better understood and further objects and advantages thereof will become more apparent from the ensuing detailed description of a preferred embodiment taken in conjunction with the drawing.

BRIEF DESCRIPTION OF THE DRAWING

The drawing shows an exemplary embodiment of the present invention.

DESCRIPTION OF THE PREFERRED EMBODIMENT

The drawing shows a tandem main brake cylinder 1 having two brake cylinder pistons 2 and 3. The piston 2 is supported by means of a spring 5 seated on the bottom of the main brake cylinder, and another spring 4 which is disposed between the two pistons 2 and 3. In the pressureless position of the pistons 2 and 3 shown in the drawing, the chambers 1a and 1b located in front of the pistons are connected with the reservoirs 6 and 7. Outlets 8 and 9 are connected with the brake circuits to be supplied. If pressure is admitted to a control chamber 10 in back of the piston 3, piston 3 and piston 2 are displaced so that pressure can be admitted to the connected brake circuits.

Fluid pressure is supplied by a pump 15 which has a reservoir 16 connected to the pressure line. The fluid is directed through a one-way valve 21 which is urged in a closed position by spring 22. The valve 21 is opened by a piston plunger 23a which extends from piston 23. Piston 23 is urged toward valve 21 by a backing spring 24 which applies a constant force on valve 21. The pressure applied to valve 21 by the pump aided by the spring 22 overcomes the force of spring 24 to keep the valve 21 closed when no pressure is applied to the plunger 11 by pedal 20. The fluid enters the area between the valve 21 and piston 23 and is conducted to supply conduit 12 in plunger 11. The plunger is provided with a one-way valve 13 and backing spring 14 which closes off supply conduit 12 from chamber 10. A pressure source such as an accumulator 25 is secured to the supply conduit 12 which applies a pressure onto valve 13 during the period valve 13 is closed. A drain channel 17 is integrated into piston 3 and drains fluid from control chamber 10 to reservoir 7 during nonoperating periods. A valve closing member 18 is secured to the front end of plunger 11 and closes off chamber 17 after the plunger has moved a certain distance due to foot pressure on pedal 20. A plunger 19 is pivotably secured about one end within an end section of plunger 11 and is provided with an extension 26. The plunger 19 is provided with a 90° end portion 27 that contacts the back end of piston 3 and a backward extending member 28 that functions to open one-way valve 13 in plunger 11 when the plunger has moved sufficiently for extending member 28 to contact valve 13.

As long as the pedal 20 is not operated, the valve 13 backed by spring 14 in the plunger 11 remains closed and the pressure source 25 is connected with the supply conduit 12 in the plunger, but not with the control chamber 10. The closing member 18, which is fastened to the plunger 11 is not seated to close off drain channel 17 until operation of the pedal 20. Therefore, the chamber 10 and the channel 17 connected with the reservoir 7 is not subjected to the applied pressure source.

When the pedal 20 is operated over a certain distance, the closing member 18 is seated in the end of drain channel 17 atop the piston 3 and the drain channel 17 is closed thereby. At the same time the valve 13/14 is opened by movement of the member 28 on plunger 19 as a result of end 27 engaging the end of the piston 3, and pressure is admitted to the chamber 10 via open valve 13 in accordance with the pedal movement. When the valve 13 opens, pressure of pressure source 25 supplies a pressure force in the chamber 10 and consequently onto piston 23 to force the piston rod 23a against valve 21 which opens valve 21. As valve 21 opens, the fluid under pressure from pump 15 is permitted to enter the supply conduit 12 via valve 21. At this time valve 13 is open; therefore, fluid under pressure from the pump enters chamber 10 via valve 13. Since the fluid under the pressure of the pump 15 enters chamber 10 pressure builds up in chamber 10 to force the piston 3 forward. As the pedal is moved further the piston 3 will be moved by the pump fluid pressure. As the piston 3 is moved due to the pump pressure, the fluid supply lines from reservoirs 6 and 7 are closed off and the fluid in chambers 1a and 1b is force to the brake circuits to operate the brakes.

It is noted that the area of piston 23 which is exposed to chamber 10 is greater than the area of piston 23 exposed to the pressure source 25 by the area displaced by the plunger 23a secured to the one face of the piston.

The control piston 23 is exposed on one side to the pressure in the chamber 10 and the backing force of spring 24, and on the other side, for all practical purposes, to the pressure of the pressure source. When the valve 13/14 is opened, because of the displacement of the plunger 11, the pressure of the fluid in pressure source 25 is extended to the chamber 10. Thus, the pressure in chamber 10 becomes the same as the pressure of source 25. Since the displacement area of piston 23 exposed to the chamber 10 is greater than the displacement area on the side with plunger 23a, the piston 23 will be forced toward the valve 21 thereby opening the valve 21. When valve 21 opens the pump pressure is applied to the piston 3 via the valve 21 and valve 13 which functions to apply the pressure to the brake circuits.

When the brake pedal is released, the plunger 11 moves away from piston 3 so that plunger element 28 no longer displaces the valve 13. Valve 13 closes and as the plunger moves from piston 3, valve 18 is disengaged from channel 17 so that pressure in chamber 10 is relieved. When the pressure in channel 10 is relieved, the piston 23 is forced by the pressure source to close valve 21. The pressure source 25 then keeps piston 23 from engaging valve 21 and assists in keeping valve 13 closed.

In the drawing, valve 21 with spring 22 interposed between the pressure source 15/16 and the chamber 10 is operated by the control piston 23. This valve 21/22 acts together with the control piston 23 and the backing spring 24 as a pressure regulator in order to minimize the pressure jump during the opening of the valve 13/14.

Obviously the system will be provided with a pressure relief valve for the fuel pump such as well known in the art but not shown for simplification of the drawings.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A braking-force booster which comprises: a pressure source, a pedal-operated control valve and at least one main brake cylinder, at least one piston in said at least one brake cylinder for generating a brake pressure, said piston being exposed to a pressure created in the main brake cylinder by means of said control valve, a first connecting passage in said at least one piston between the main brake cylinder and a pressureless connection, a movable first plunger displaceable by a pedal, said plunger extending into said main brake cylinder, a valve closing member on said plunger for shutting off said first connecting channel as said plunger is moved toward said at least one piston, a second connecting channel in said plunger, a seat valve in said second channel serving to close off said second channel, a second plunger supported on said first plunger relative to said valve closing member in said plunger for opening said seat valve closure member during a corresponding approach of said first plunger towards the main brake cylinder piston, a pressure regulator placed ahead of said seat valve in said plunger for the reduction of a pressure jump of said seat valve, said pressure regulator includes a spring loaded valve, a movable piston in said pressure chamber operatively related to said spring loaded valve, a spring backing said piston, and a second pressure source which connects with said second connecting channel.

* * * * *